United States Patent
Weber et al.

(10) Patent No.: US 12,299,936 B2
(45) Date of Patent: May 13, 2025

(54) LOW-BITRATE ENCODING OF HIGH DYNAMIC RANGE CONTENT

(71) Applicant: Avid Technology, Inc., Burlington, MA (US)

(72) Inventors: Markus Weber, Woerth (DE); Mykola Gerasymenko, Boryspil (UA)

(73) Assignee: AVID TECHNOLOGY, INC., Burlington, MA (US)

( * ) Notice: Subject to any disclaimer, the term of this patent is extended or adjusted under 35 U.S.C. 154(b) by 474 days.

(21) Appl. No.: 17/683,071

(22) Filed: Feb. 28, 2022

(65) Prior Publication Data

US 2023/0274464 A1   Aug. 31, 2023

(51) Int. Cl.
| | |
|---|---|
| *G06T 9/00* | (2006.01) |
| *G06T 3/40* | (2024.01) |
| *H04L 65/60* | (2022.01) |
| *H04L 65/70* | (2022.01) |
| *H04L 65/75* | (2022.01) |

(52) U.S. Cl.
CPC .............. *G06T 9/00* (2013.01); *G06T 3/40* (2013.01); *H04L 65/70* (2022.05); *H04L 65/75* (2022.05)

(58) Field of Classification Search
None
See application file for complete search history.

(56) References Cited

U.S. PATENT DOCUMENTS

| | | | | |
|---|---|---|---|---|
| 2011/0273495 A1* | 11/2011 | Ward | ................... | G09G 3/3413 345/694 |
| 2012/0008015 A1* | 1/2012 | Manabe | ............... | H04N 23/741 348/E9.053 |
| 2013/0027371 A1* | 1/2013 | Saitoh | .................. | H04N 1/6086 345/207 |
| 2016/0005349 A1* | 1/2016 | Atkins | ...................... | G06T 7/13 345/591 |

(Continued)

OTHER PUBLICATIONS

S. Mahmalat, et al., "Luminance independent chromaticity preprocessing for HDR video coding," 2016 IEEE International Conference on Image Processing (ICIP), Phoenix, AZ, USA, 2016, pp. 1389-1393, doi: 10.1109/ICIP.2016.7532586 (Year: 2016).*

(Continued)

*Primary Examiner* — Mohammad J Rahman
(74) *Attorney, Agent, or Firm* — Oliver Strimpel (57) ABSTRACT

Low bitrate encoding of HDR-coded content with codecs that achieve compression by lowering the precision of encoding can result in significant loss of color fidelity. The problem stems from the logarithmic nature of the HDR encoding and consequent excessive quantization of color components of HDR-coded material. The loss is ameliorated by applying a saturation emphasis function that boosts color values of the HDR-coded material prior to compression. In various implementations the saturation emphasis function is a monotonically increasing function that preferentially boosts lower color values. Following compression and subsequent decompression, the color boost is reversed. In video post-production workflows proxies may be compressed to (Continued)

very low bitrates. For such workflows, the described methods significantly reduce codec-induced color artifacts in the decompressed proxy, thus restoring the ability of editors to make valid technical decisions based on the proxy during post-production.

17 Claims, 3 Drawing Sheets

(56) References Cited

U.S. PATENT DOCUMENTS

| | | | |
|---|---|---|---|
| 2016/0117975 A1* | 4/2016 | Kang | G09G 3/2003 345/694 |
| 2017/0347113 A1* | 11/2017 | De Haan | H04N 19/46 |
| 2018/0336669 A1* | 11/2018 | Mertens | H04N 1/6027 |
| 2020/0193890 A1* | 6/2020 | Tichelaar | G09G 3/2003 |
| 2021/0149984 A1* | 5/2021 | Luo | H04N 19/122 |
| 2021/0266509 A1* | 8/2021 | Nijland | H04N 19/186 |
| 2021/0360266 A1* | 11/2021 | Van Der Vleuten | G06T 5/92 |

OTHER PUBLICATIONS

Strom, Jacob et al., High Quality HDR Video Compression Using HEVC Main 10 Profile, Picture Coding Symposium 2016, 5 pages.

* cited by examiner

LOW-BITRATE ENCODING OF HIGH DYNAMIC RANGE CONTENT

BACKGROUND

High dynamic range (HDR) imaging techniques are used to increase the dynamic range that can be captured in images and video. It is commonly used when capturing imagery in high-contrast situations. In order to store imagery efficiently and to make optimal use of limited bandwidth when transmitting imagery and video, image data is normally compressed. There are a number of commercially available encoders and decoders (codecs) used to compress and decompress the data. However, the codecs are designed to work with standard dynamic range (SDR) data in that the bitrate/quantization controllers have been optimized for SDR content with no special HDR optimizations. Although existing codecs would be able to distinguish SDR content from HDR content, it is not necessary to do so at commercially viable distribution bitrates, such as 6, 12, and 25 megabits per second (Mbps). At such bandwidths, artifacts introduced by the codecs remain hidden to most lay viewers. But this does not hold when using extreme compression that is required at bandwidths below 6 Mbps, and especially at bandwidths of 3 Mbps or lower. To better serve this very low bitrate use case, the codecs would have to change their quantization/bitrate control strategy explicitly for these cases. Thus, while existing codecs are able to compress and decompress HDR imagery, their quality degrades significantly at low bandwidths. Specifically, compression of HDR at low bitrates may result in a disproportionate loss of color saturation. This degradation may be further amplified when the HDR coding is inverted during display processing. The resulting imagery may present a misleading picture to a post-production operator performing color correction or other finishing operations. This presents a problem in many use cases where compressed video is used as a proxy for the high-resolution imagery in the editing workflow.

Therefore, for low bitrate encodings, there is a need to improve the encoding and decoding of HDR imagery to reduce or eliminate artifacts that may be introduced by codecs designed for SDR imagery. The need is especially acute in proxy workflows when low bitrate encoding is used as these are not intended for end-user consumption, but to make editorial decision which need to be fully applicable to the original.

SUMMARY

In general, the saturation of the color components of HDR-coded imagery is increased by applying a saturation emphasis function prior to encoding. This has the effect of causing the codec to use less aggressive quantization/limiting of the color values. After decoding, the saturation emphasis is reversed.

In general, in one aspect, a method of pre-processing high dynamic range (HDR) coded video comprises: receiving the HDR-coded video, wherein the HDR-coded video is encoded in a color space having a luminance component and two color components; applying a saturation emphasis function to the color components of the HDR-coded video, wherein the saturation emphasis function boosts values of the color components of the HDR-coded video to generate color-boosted HDR-coded video; and providing the color-boosted HDR-coded video to an encoder for compressing the HDR-coded video.

Various embodiments include one or more of the following features. The saturation emphasis function is a non-linear monotonically increasing function that preferentially boosts levels of HDR-coded color values below a given HDR-coded color value. The saturation emphasis function is based on a gamma function. Using the encoder to compress the HDR-coded video to a bitrate of less than or equal to 6 Mbps. The received HDR-coded video is a proxy version of a high-resolution HDR-coded video, wherein the proxy has at least one of a lower spatial resolution and a lower bit-depth than the high-resolution HDR-coded video. The encoder uses discrete cosine transform (DCT) compression.

In general, in another aspect, a method of processing decompressed HDR-coded video to generate a proxy comprises: receiving the decompressed HDR-coded video, wherein the decompressed HDR-coded video was generated by decompressing compressed HDR-coded video and wherein the compressed HDR-coded video was generated by compressing an original HDR-coded video to which a saturation emphasis function had been applied to color components of the HDR-coded video prior to compression; applying an inverse of the saturation emphasis function to the decompressed HDR-coded video to generate color de-boosted decompressed HDR-coded video; and displaying the color-de-boosted HDR-coded video.

Various embodiments include one or more of the following features. The original HDR-coded video is a proxy video generated from a high-resolution original version; the proxy has at least one of a lower spatial resolution and a lower bit-depth than the high-resolution original version; and the proxy is used by an editor as a basis for performing post-production operations on the high-resolution original version. The saturation emphasis function is a non-linear monotonically increasing function that preferentially boosts levels of HDR-coded color values below a given HDR-coded color value. The saturation emphasis function is based on a gamma function. A bitrate of the compressed HDR-coded video is less than or equal to 6 Mbps. The compression and decompression of the HDR-coded video was performed by a codec using DCT compression and decompression.

In general, in a further aspect, a method of processing HDR-coded video comprises: receiving uncompressed HDR-coded video, wherein the HDR-coded video is encoded in a color space having a luminance component and two color components; applying a saturation emphasis function to the color components of the HDR-coded video wherein the saturation emphasis function boosts values of the color components of the HDR-coded video to generate color-boosted HDR-coded video; compressing the color-boosted HDR-coded video using a discrete cosine transform-based encoder; transmitting the compressed color-boosted HDR-coded video over a network; receiving the compressed color-boosted HDR-coded video via the network; decompressing the compressed color-boosted HDR-coded video to generate decompressed color-boosted HDR-coded video; applying an inverse of the saturation emphasis function to the decompressed color-boosted HDR-coded video to generate decompressed HDR-coded video; and displaying the decompressed HDR-coded video.

Various embodiments include one or more of the following features. A bitrate of the compressed color-boosted HDR-coded video is less than or equal to 6 Mbps. The received HDR-coded video is a proxy video generated from a high-resolution original version; the proxy has at least one of a lower spatial resolution and a lower bit-depth than the high-resolution original version; and the proxy is used by an editor as a basis for performing post-production operations on the high-resolution original version. The saturation emphasis function is a non-linear monotonically increasing function that preferentially boosts levels of HDR-coded color values below a given HDR-coded color value. The saturation emphasis function is based on a gamma function. The compression and decompression of the HDR-coded video is performed by a codec using DCT compression and decompression.

In general, in another aspect, a computer program product comprises: a non-transitory computer-readable medium with computer-readable instructions encoded thereon, wherein the computer-readable instructions, when processed by a processing device instruct the processing device to perform a method of pre-processing high dynamic range (HDR) coded video, the method comprising: receiving the HDR-coded video, wherein the HDR-coded video is encoded in a color space having a luminance component and two color components; applying a saturation emphasis function to the color components of the HDR-coded video, wherein the saturation emphasis function boosts values of the color components of the HDR-coded video to generate color-boosted HDR-coded video; and providing the color-boosted HDR-coded video to an encoder for compressing the HDR-coded video.

In general, in another aspect, a system comprises: a memory for storing computer-readable instructions; and a processor connected to the memory, wherein the processor, when executing the computer-readable instructions, causes the system to perform a method of pre-processing high dynamic range (HDR) coded video, the method comprising: receiving the HDR-coded video, wherein the HDR-coded video is encoded in a color space having a luminance component and two color components; applying a saturation emphasis function to the color components of the HDR-coded video, wherein the saturation emphasis function boosts values of the color components of the HDR-coded video to generate color-boosted HDR-coded video; and providing the color-boosted HDR-coded video to an encoder for compressing the HDR-coded video.

DETAILED DESCRIPTION

Existing codecs were not designed with HDR content in mind, even though they are routinely used with HDR content. In effect, the codec assumes that the incoming, uncompressed, video data are coded according to the original design specifications, which date back to the late 1990s and assume that the video content is coded according to SDR. H.264 is an example of such a codec. Codecs are finely tuned in order to retain the best possible quality for the assumed incoming content subject given a maximum allowed bitrate. This tuning heavily favors the luma components of the video as compared to the color component because luma has a bigger impact on human perception of image quality than the color. Although human color vision is poor as compared to luma vision, it is still an important aspect of an image and eventually every user, even a lay viewer, may notice the color deterioration in an image if color is neglected by the codec. The favoring is implemented by devoting the majority of the available bandwidth to luminance. However, since the overall available bandwidth is constrained, this can only be achieved at the expense of the bandwidth devoted to color. While this trade-off is generally advantageous, the impact on the color becomes more severe in the case of HDR content, and especially so when the HDR-coded content is compressed to very low bitrates.

HDR content, when linearly encoded, spans a large range of values, requiring the use of up to 16 bits of precision per color component. For more efficient storage, the content is coded at a reduced bit depth, applying a logarithmic-style transformation to the linear input values. This is then used as input to a compression codec without explicitly informing it of the coding previously applied to achieve the reduction in size. Compared to standard SDR coding the content will appear pale (desaturated) and darkish (reduced in brightness) as a result of the log-coding. During compression, the codec does not change its approach, but while in a normal SDR image about 15-20% of the pixels fall into the pale region, the HDR coding causes 95% of the pixels to fall into this region. In a normal SDR image, quantizing these areas is usually not noticed because it only affects a small portion of the image, but for HDR coding it dominates the result. In common use cases involving proxy workflows, the content may be compressed to as low as 3 Mbps when the quality of the color encoding, even with SDR, is on the edge of what may be considered acceptable. Noticeable losses start occurring even when the bandwidth falls below about 6 Mbps when the codec effectively ignores color altogether to keep the luminance information level up. Furthermore, to conserve bandwidth still further, the data may be encoded with a bit depth of 8 bits instead of the 10 bits usually considered the minimal viable bit depth, thus making any quantization errors 4 times as large as in the 10-bit versions. In this situation, even a slight lowering of the bitrate may result in a large quality loss.

The use case primarily considered herein is oriented towards video production workflows in which the low bandwidths are used to carry proxy encodings of the video. Such proxies are not intended for end user consumption but instead are used as the basis of editing and other technical decisions by members of the production team, as described further below.

The encoding of HDR content occurs in RGB space, in which the linear acquisition RGB components are converted into non-linear coded values R'G'B'. The transfer function used for this conversion may be one of several functions that are commonly used. Industry standard examples include hybrid log-gamma (HLG) and perceptual quantizer (PQ), both of which are standardized by the Society of Motion Picture and Television Engineers (SMPTE) under ITU-R BT.2100-0 and published as the SMPTE ST 2084 standard. In addition, various vendors provide proprietary transfer functions, such as Sony Slog3, Panasonic Vlog, and Arri LogC. These functions all code densely at low values and sparsely at high values.

Before compression via a DCT-based video codec, the R'G'B' values are converted into the Y'Cb'Cr' space, in which Y' represents the luma value, and Cb' and Cr' represent the color components. The logarithmic nature of the encoding of R'G'B' values results in Y'Cb'Cr' values having very low levels of color saturation. Given the number of bits allocated to the color component encoding, the codec interprets this low saturation as an almost complete absence of color in the image. During rate control, the codec favors the luminance channel, and the low saturation of the color channels further causes it to apply a disproportionately large quantization to the color values. At no time is the codec explicitly aware that it is encoding HDR content, which contains more information in the color dynamic range than SDR content. The result is excessive quantization of the color values, which translates into a loss of saturation and/or color fidelity. In the most extreme case, only the DC components survive, and the resulting image will have the average color value of natural images, which is grey.

Figure 1:
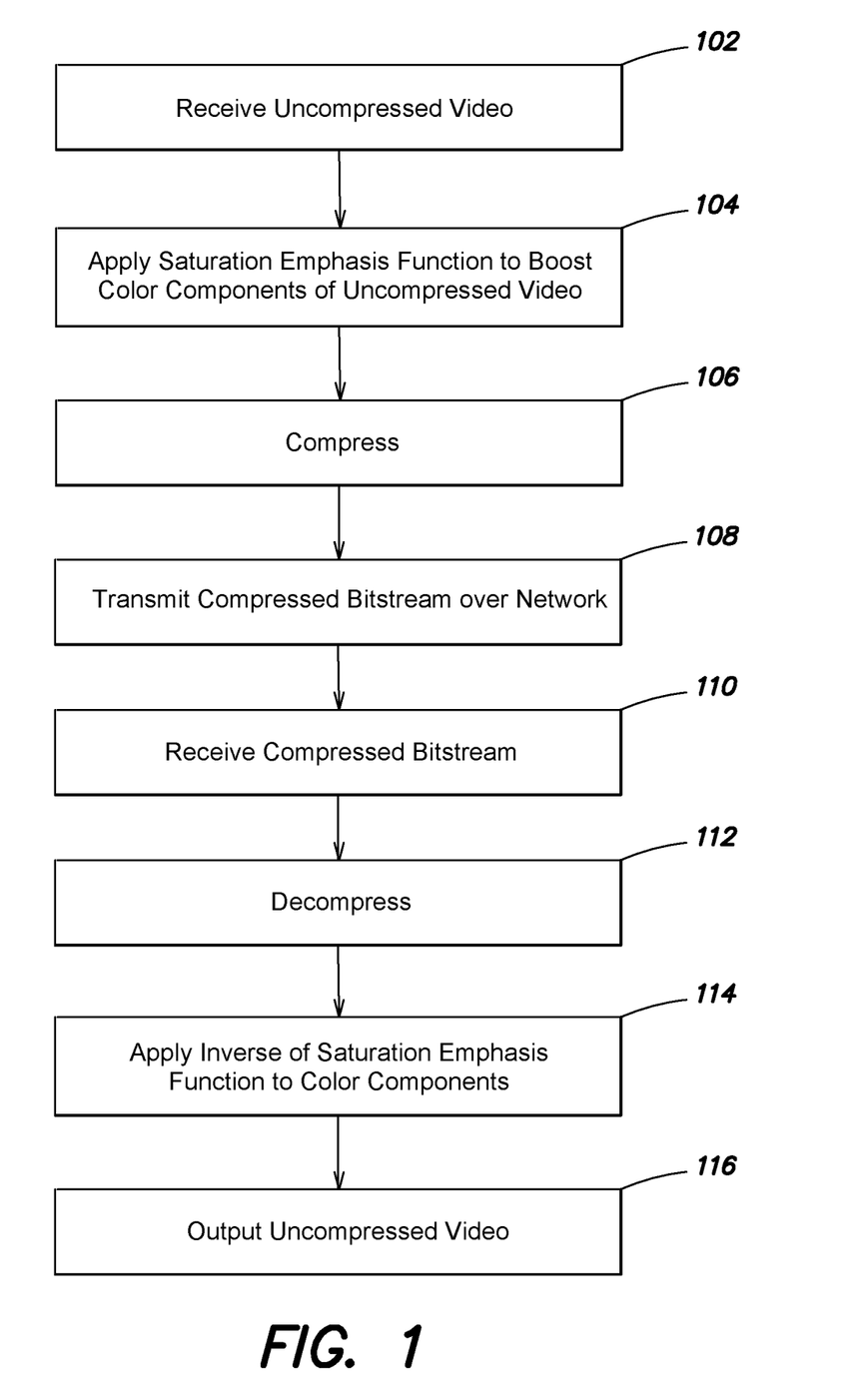
FIG. 1 is a high-level flow diagram showing the principal steps involved in the described method of improving low bitrate encoding of HDR video.

The methods described herein address this problem by increasing the saturation of the color components of the HDR-encoded content before compression. FIG. 1 is a high-level flow diagram showing the steps involved. The HDR-encoded values Y'Cb'Cr' representing the uncompressed HDR-encoded content are received by the system (step 102). For the workflows principally envisaged herein, the received video is a proxy previously generated from high-resolution original video. The proxy has at least one of lower spatial resolution and a lower bit depth than the original. For example, the proxy may only use HD resolution and a bit-depth of 8 bits.

The saturation of the HDR-encoded content is then increased by applying a saturation emphasis function on just the Cb' and Cr' component values (step 104). The saturation emphasis function is chosen to be non-linear because the value range of the digital color components, especially in 8-bit, is very limited and it is important not to destroy any higher saturated content dynamics by driving it into saturation (i.e., where it is clipped) at the upper end of the value scale.

In the methods described herein, this is achieved by preferentially boosting the lower range of color values by effectively expanding the scale and compressing the upper range of values. Codecs reduce size by applying an integer divider known as the quantization factor. At low bitrates, instead of applying a quantization factor of 2 or 3, the codec may apply a quantization factor of 10 or 20, with this division being inverted in the decode stage. This has the effect of mapping the original color values to a single or a very small number of coded values. For example, if all the original values are between 0 and 10, then because of the log characteristic, the use of a quantization factor of 10 will result in all the values being mapped to zero. However, if the original values are multiplied by a boosting factor, say 5, before the divider is applied, fewer original values are mapped to single coded values. This prevents the codec from, in effect, eliminating the values. Thus, an effective countermeasure is to apply a multiplier before compression that somewhat cancels out the effect of the divider. In other words, the boosting of the color components forces the codec to become less aggressive on the quantization and limiting of the color values. The magnitude of the quantization error may be of the same order as in the unmodified case, but because the color values have been boosted, fewer colors will be forced into a single quantization level and the relative error becomes significantly smaller.

The color-boosted encoded HDR content is then passed to a compression codec and compressed (step 106). The compressed bitstream may be as low as 6 Mbps or lower, with 3 Mbps being a practical lower limit. The methods described herein are applicable to compression schemes that achieve compression by limiting the precision of the coded values, which include DCT-based codecs. The compressed HDR content may then be transmitted over a network (step 108) at low bandwidth as part of a proxy-based video production workflow. The receiving system receives the compressed HDR content (step 110). When the uncompressed HDR content is required, the DCT codec performs the decompression (step 112), and then the boosting of the HDR-coded color components is reversed by applying the inverse of the saturation emphasis function (step 114). The decompressed, de-boosted HDR-coded material may then be output (step 116), for example to a display of a non-linear video editing system. An example of a non-linear video editing system, is Media Composer®, a product of Avid® Technology, Inc. of Burlington, Mass.

The color saturation emphasis function is chosen to boost the values of small HDR-coded color values (Cb and Cr) to higher saturation levels and compress the levels near the maximum allowable color value. Thus, the slope of the saturation emphasis function is greater than one (i.e., the color value scale is expanded) up to a given input color value, and lower than one (i.e., the color value scale is compressed) above the given input color value. Any continuous, strictly monotonically increasing function may be used. Saturation functions that reach their maximum value before the boundary value of the color saturation, i.e., that are clipped, are to be avoided since a requirement of the saturation emphasis function is that it be invertible (as indicated in step 114). While the compression of the higher color values may result in some loss of precision in these values, the color dynamic is not entirely destroyed, as it would be if the values were driven to saturation. Furthermore, the impact of this loss of precision is minor because the HDR coding of color concentrates the color values in the lower end of the color value range, with most color values occupying the lower 30% of the range. Thus, the paucity of values in the higher end of the range that would be compressed by the saturation emphasis function means that the precision loss associated with the compression does not have a significant impact on the resulting imagery.

Figure 2:
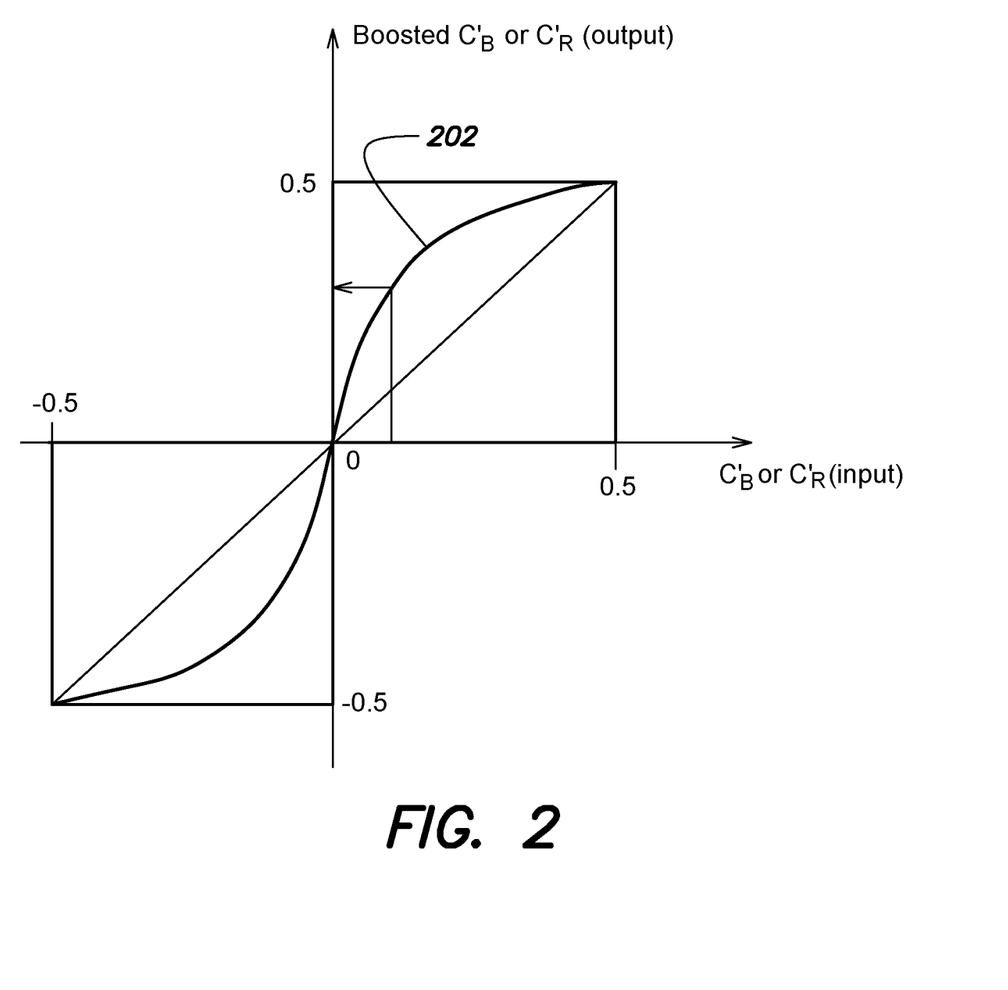
FIG. 2 is a graph showing an example of a saturation emphasis function.

In various implementations, a function based on the gamma function is used. In certain implementations, the saturation emphasis function f(x) is given by:

$$f(x) = 0.5\left(\frac{x}{0.5}\right)^{\left(\frac{1}{gamma}\right)}; 0 \leq x \leq 0.5$$
$$= -0.5\left(\frac{\text{abs}(x)}{0.5}\right)^{\left(\frac{1}{gamma}\right)}; -0.5 \leq x < 0$$

for values of gamma >1. FIG. 2 illustrates the use of non-linear saturation emphasis function 202 that preferentially boosts the small values of the color components as compared to the high values. In effect, the saturation emphasis function counteracts the effect of the log scale of HDR color values. The saturation emphasis function may be implemented via a one-dimensional look-up table during the transfer of the color component values to the codec, which would have no noticeable impact on the codec's performance.

The approach described herein may be used with all DCT-based codecs, including but not limited to, JPEG, MJPEG, MPEG2, H.264 (AVC), and H.265 (HEVC).

The impact of the enhanced handling of the color components of HDR-encoded imagery may not be readily visible unless the high-resolution original and the low-bit-rate proxy are viewed side-by-side. However, when video is distributed as part of an editorial workflow, the colors are not just visible attributes of an image but instead may drive technical processing decisions. For example, color keying techniques, such as green screen and blue screen, which are widely used in post-production, are sensitive to both color and brightness level. If the colors of a proxy do not faithfully reflect those of the high-resolution imagery, the color-keying based on the proxy will be invalid for the high-resolution imagery. An editor may then have to repeat the color keying with the high-resolution imagery, severely hampering the applicability of the proxy workflow. Operations which use differential color correction, such as selective color correction also rely on an operator's ability to base decisions on colors. In one example, a post-production editor may wish to exchange one color of some clothing for a different one, with other colors in the image being close by. This is usually performed using color isolation, thereby avoiding the need to spatially limit the processing to a portion of the image. Another post-production area that relies on the specific color attributes is the "looks" of a scene. Looks use look-up tables to achieve a specific artistic appearance. These are very sensitive to actual color levels. Even relatively minor color discrepancies between the proxy and the high-resolution imagery may prevent an editor from making correct editorial decisions without going back to the original. In one common use case, green screens and keys are used to separate foreground portions of an image from a background portion. The choice of parameters depends critically on the color content of the imagery. If the parameters are selected on the basis of a proxy having an incorrect color definition, a parametrization may be chosen which works perfectly for the proxy but fails when used with the high resolution imagery. For such editorial workflows, the consistency of the proxy color with respect to its corresponding high-resolution imagery is more important than an absolute quality metric of the proxy. The described methods achieve the desired consistency by, in effect, causing the codec to devote more bandwidth to the color components of the encoded HDR content.

A significant advantage of the described methods accrues from their transparency to the codec. The codec operates in its normal, unmodified fashion, and thus the method may be used with almost any existing codec in which compression is achieved by limiting the precision of the coded values such as the DCT-based codecs.

Figure 3:
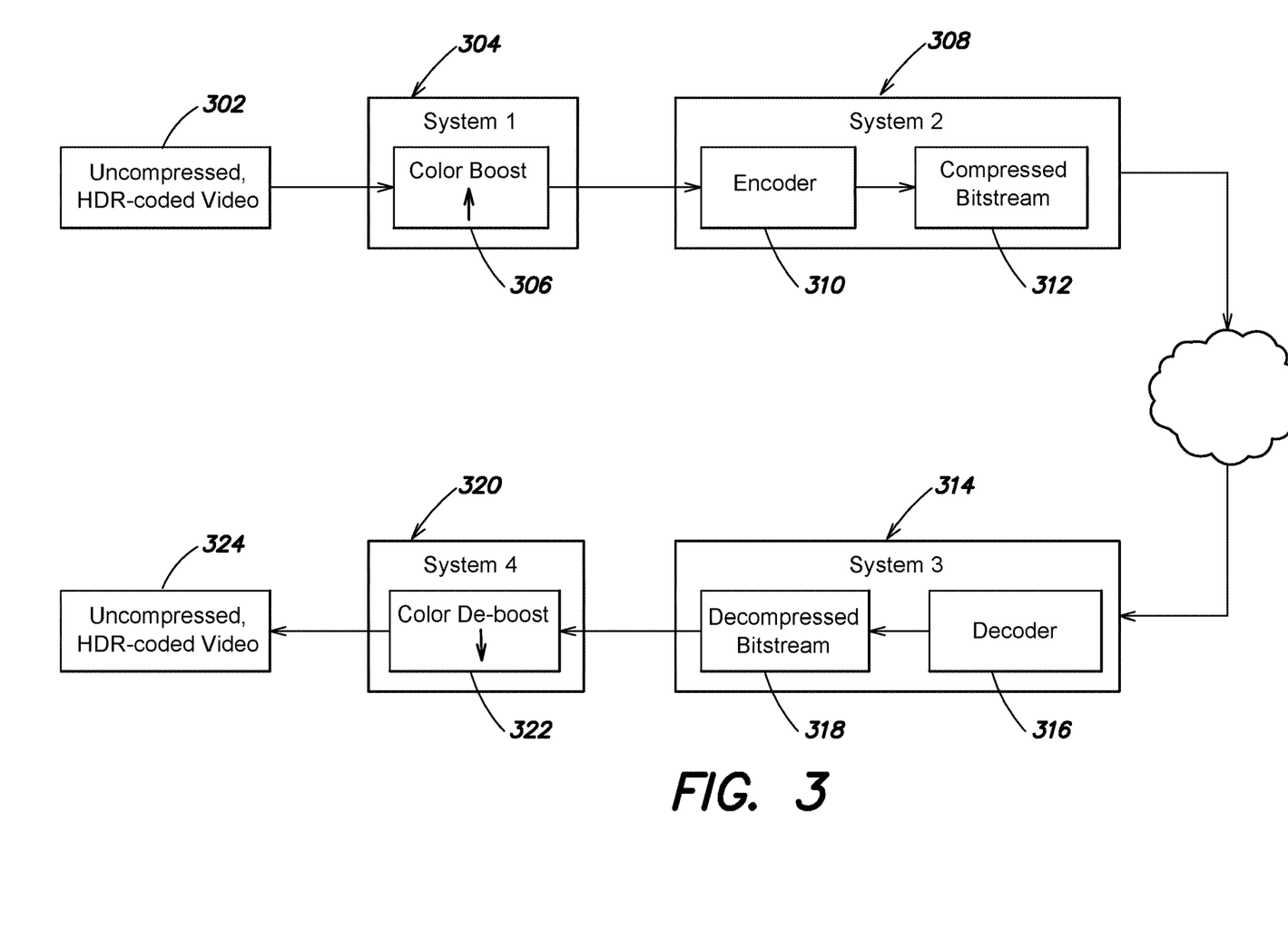
FIG. 3 is a high-level block diagram of a system for implementing the described improvement of low bitrate encoding of HDR video.

A high-level block diagram of a system for performing the improved low bitrate encoding of HDR content is shown in FIG. 3. Uncompressed video 302 is received by computer system 1 (304), which performs color boost operation 306, using a saturation emphasis function, as described above. The boosted uncompressed video is sent to system 2 (308), where it is compressed by encoder 310 to generate compressed bitstream 312. This may be transmitted over a network and received at a second location. There, system 3 (314) receives the compressed bitstream and decompresses it using decoder 316 to generate decompressed bitstream 318. The decompressed bitstream is sent to system 4 (320) which performs color de-boost operation 322 on the bitstream to generate uncompressed video output 324 at the second location. The color de-boost is achieved by applying the inverse of the saturation emphasis function applied by system 1. In various embodiments the functions performed by system 1 and system 2 are performed sequentially by a single system. Similarly, the decompression and de-boosting performed by systems 3 and 4 respectively may be performed sequentially by a single system. In some implementations, some or all of the four systems illustrated in FIG. 3 may be implemented in the cloud.

The various components of the system described herein may be implemented as a computer program using a general-purpose computer system. Such a computer system typically includes a main unit connected to both an output device that displays information to an operator and an input device that receives input from an operator. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, OLED displays, various stereoscopic displays including displays requiring viewer glasses and glasses-free displays, cathode ray tubes, video projection systems and other video output devices, loudspeakers, headphones and other audio output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a keyboard, keypad, track ball, mouse, pen/stylus and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of pre-processing high dynamic range (HDR) coded video, the method comprising:
   receiving the HDR-coded video, wherein the HDR-coded video is encoded in a color space having a luminance component and two color components;
   applying a saturation emphasis function to the color components of the HDR-coded video to generate color-boosted HDR-coded video, wherein the saturation emphasis function:
      preferentially boosts lower values of the color components of the HDR-coded video such that, when quantized by a scale factor during subsequent encoding by a DCT-based video codec, an increased number of the color components are mapped to a non-zero value; and
      adjusts values of the color components of the HDR-coded video that are near a maximum allowable value;
   providing the color-boosted HDR-coded video to an encoder for compressing the HDR-coded video; and
   wherein, following decompression of the compressed HDR-coded video, an inverse of the saturation emphasis function is applied to the color components to generate decompressed HDR-coded video in which degradation resulting from the use of the DCT-based codec is reduced as compared with HDR-coded video that has been compressed and decompressed without application of the saturation emphasis function.

2. The method of claim 1, wherein the saturation emphasis function is a non-linear monotonically increasing function that preferentially boosts levels of HDR-coded color values below a given HDR-coded color value.

3. The method of claim 1, wherein the saturation emphasis function is based on a gamma function.

4. The method of claim 1, further comprising using the encoder to compress the HDR-coded video to a bitrate of less than or equal to 6 Mbps.

5. The method of claim 1, wherein the received HDR-coded video is a proxy version of a high-resolution HDR-coded video, wherein the proxy has at least one of a lower spatial resolution and a lower bit-depth than the high-resolution HDR-coded video.

6. A method of processing decompressed HDR-coded video to generate a proxy, the method comprising:
   receiving the decompressed HDR-coded video, wherein:
      the decompressed HDR-coded video was generated by decompressing compressed HDR-coded video;
      the compressed HDR-coded video was generated by compressing an original HDR-coded video to which a saturation emphasis function had been applied to color components of the HDR-coded video prior to compression; and
   the saturation emphasis function:
      preferentially boosts lower values of the color components of the HDR-coded video such that, when quantized by a scale factor during subsequent encoding by a DCT-based video codec, an increased number of the color components are mapped to a non-zero value; and
      adjusts values of the color components of the HDR-coded video that are near a maximum allowable value;
   applying an inverse of the saturation emphasis function to the decompressed HDR-coded video to generate color de-boosted decompressed HDR-coded video; and
   wherein degradation resulting from the use of the DCT-based codec is reduced on the color de-boosted saturation emphasis function as compared with HDR-coded video that has been compressed and decompressed without application of the saturation emphasis function.

7. The method of claim 6, wherein:
   the original HDR-coded video is a proxy video generated from a high-resolution original version;
   the proxy has at least one of a lower spatial resolution and a lower bit-depth than the high-resolution original version; and
   the proxy is used by an editor as a basis for performing post-production operations on the high-resolution original version.

8. The method of claim 6, wherein the saturation emphasis function is a non-linear monotonically increasing function that preferentially boosts levels of HDR-coded color values below a given HDR-coded color value.

9. The method of claim 6, wherein the saturation emphasis function is based on a gamma function.

10. The method of claim 6, wherein a bitrate of the compressed HDR-coded video is less than or equal to 6 Mbps.

11. A method of processing HDR-coded video, the method comprising:
   receiving uncompressed HDR-coded video, wherein the HDR-coded video is encoded in a color space having a luminance component and two color components;
   applying a saturation emphasis function to the color components of the HDR-coded video wherein the saturation emphasis function boosts values of the color components of the HDR-coded video to generate color-boosted HDR-coded video and wherein the saturation emphasis function:
      preferentially boosts lower values of the color components of the HDR-coded video such that, when quantized by a scale factor during subsequent encoding by a DCT-based video codec, an increased number of the color components are mapped to a non-zero value; and
      adjusts values of the color components of the HDR-coded video that are near a maximum allowable value;
   compressing the color-boosted HDR-coded video using a discrete cosine transform-based encoder;
   transmitting the compressed color-boosted HDR-coded video over a network;
   receiving the compressed color-boosted HDR-coded video via the network;

decompressing the compressed color-boosted HDR-coded video to generate decompressed color-boosted HDR-coded video;

applying an inverse of the saturation emphasis function to the decompressed color-boosted HDR-coded video to generate decompressed HDR-coded video; and wherein degradation resulting from the use of the DCT-based codec is reduced on the color de-boosted saturation emphasis function as compared with HDR-coded video that has been compressed and decompressed without application of the saturation emphasis function.

12. The method of claim 11, wherein a bitrate of the compressed color-boosted HDR-coded video is less than or equal to 6 Mbps.

13. The method of claim 11, wherein:

the received HDR-coded video is a proxy video generated from a high-resolution original version;

the proxy has at least one of a lower spatial resolution and a lower bit-depth than the high-resolution original version; and the proxy is used by an editor as a basis for performing post-production operations on the high-resolution original version.

14. The method of claim 11, wherein the saturation emphasis function is a non-linear monotonically increasing function that preferentially boosts levels of HDR-coded color values below a given HDR-coded color value.

15. The method of claim 11, wherein the saturation emphasis function is based on a gamma function.

16. A non-transitory computer-readable medium comprising:

computer-readable instructions encoded on the non-transitory computer-readable medium, wherein the computer-readable instructions, when processed by a processing device instruct the processing device to perform a method of processing high dynamic range (HDR) coded video, the method comprising:

receiving the HDR-coded video, wherein the HDR-coded video is encoded in a color space having a luminance component and two color components;

applying a saturation emphasis function to the color components of the HDR-coded video to generate color-boosted HDR-coded video, wherein the saturation emphasis function:

preferentially boosts lower values of the color components of the HDR-coded video such that, when quantized by a scale factor during subsequent encoding by a DCT-based video codec, an increased number of the color components are mapped to a non-zero value; and adjusts values of the color components of the HDR-coded video that are near a maximum allowable value; and providing the color-boosted HDR-coded video to an encoder for compressing the HDR-coded video; and wherein, following decompression of the compressed HDR-coded video, an inverse of the saturation emphasis function is applied to the color components to generate decompressed HDR-coded video in which degradation resulting from the use of the DCT-based codec is reduced as compared with HDR-coded video that has been compressed and decompressed without application of the saturation emphasis function.

17. A system comprising:

a memory for storing computer-readable instructions; and a processor connected to the memory, wherein the processor, when executing the computer-readable instructions, causes the system to perform a method of pre-processing high dynamic range (HDR) coded video, the method comprising:

receiving the HDR-coded video, wherein the HDR-coded video is encoded in a color space having a luminance component and two color components;

applying a saturation emphasis function to the color components of the HDR-coded video to generate color-boosted HDR-coded video, wherein the saturation emphasis function:

preferentially boosts lower values of the color components of the HDR-coded video such that, when quantized by a scale factor during subsequent encoding by a DCT-based video codec, an increased number of the color components are mapped to a non-zero value; and adjusts values of the color components of the HDR-coded video that are near a maximum allowable value;

providing the color-boosted HDR-coded video to an encoder for compressing the HDR-coded video; and wherein, following decompression of the compressed HDR-coded video, an inverse of the saturation emphasis function is applied to the color components to generate decompressed HDR-coded video in which degradation resulting from the use of the DCT-based codec is reduced as compared with HDR-coded video that has been compressed and decompressed without application of the saturation emphasis function.

\* \* \* \* \*